United States Patent
Rohrbacker (10) Patent No.: US 8,506,861 B2
(45) Date of Patent: Aug. 13, 2013

(54) MOLDING COMPOSITION AND METHOD USING SAME TO FORM DISPLACEMENTS FOR USE IN A METAL CASTING PROCESS

(75) Inventor: David A. Rohrbacker, Tucson, AZ (US)

(73) Assignee: Destech Corporation, Tucson, AZ (US)

( * ) Notice: Subject to any disclaimer, the term of this patent is extended or adjusted under 35 U.S.C. 154(b) by 877 days.

(21) Appl. No.: 12/364,135

(22) Filed: Feb. 2, 2009

(65) Prior Publication Data

US 2009/0194912 A1  Aug. 6, 2009

Related U.S. Application Data (60) Provisional application No. 61/025,259, filed on Jan. 31, 2008.

(51) Int. Cl.
*D04H 3/16* (2006.01)

(52) U.S. Cl.
USPC .................... 264/115; 264/104; 264/125

(58) Field of Classification Search
USPC .......................... 264/115, 104, 125
See application file for complete search history.

(56) References Cited

U.S. PATENT DOCUMENTS

| | | | | |
|---|---|---|---|---|
| 2,256,361 | A * | 9/1941 | Straub ............................. | 264/71 |
| 6,096,794 | A * | 8/2000 | Cunningham et al. .......... | 522/12 |
| 2001/0036894 | A1 | 11/2001 | Juma et al. | |
| 2003/0126804 | A1* | 7/2003 | Rosenflanz et al. ............ | 51/307 |
| 2006/0197063 | A1 | 9/2006 | Tennison et al. | |

OTHER PUBLICATIONS

International Search Report and Written Opinion dated Apr. 13, 2009.

* cited by examiner

*Primary Examiner* — Yogendra Gupta
*Assistant Examiner* — John Robitaille
(74) *Attorney, Agent, or Firm* — Dale F. Regelman; Quarles & Brady LLP (57) ABSTRACT

A method to form a displacement for use in a metal casting process, wherein the method provides a plurality of ceramic particles and a plurality of resin particles. The method grinds the plurality of ceramic particles until those ceramic particles comprise diameters less than 150 microns, and grinds the plurality of resin particles until those resin particles comprise diameters less than 100 microns, and forms a powder blend comprising the plurality of ground ceramic particles and the plurality of ground resin particles. The method then disposes the powder blend into a mold comprising a cavity defining the desired displacement. The method further densifies the blend, and cures the resin to form the displacement.

18 Claims, 7 Drawing Sheets

MOLDING COMPOSITION AND METHOD USING SAME TO FORM DISPLACEMENTS FOR USE IN A METAL CASTING PROCESS

CROSS REFERENCE TO RELATED APPLICATIONS

This Application is claiming priority from a U.S. Provisional Application filed Jan. 31, 2008, and having Ser. No. 61/025,259, which is hereby incorporated by reference herein.

FIELD OF THE INVENTION

This invention relates to a composition and method to form one or more displacements for use in a metal, ceramic, or cermet casting process. In certain embodiments, the invention is directed to a composition, and method using that composition, to form one or more nozzle device displacements and/or cutting bit displacements for use in a metal, ceramic, or cermet casting process to form the housing for a drilling assembly.

BACKGROUND OF THE INVENTION

Various mining and well drilling operations utilize a variety of drilling assemblies, wherein those assemblies comprise a plurality of cutting bits, in combination with and one or more nozzle devices, disposed in a complex housing assembly. Such drilling assemblies, including the arrangement of cutting bits and nozzle devices, are custom-made for specific drilling applications. In certain embodiments, each of the plurality of cutting bits and nozzle devices are removeably disposed in the housing assembly, thereby allowing replacement of used/damaged cutting bits and nozzles.

Such drilling apparatus housing assemblies are formed using a metal, ceramic, or cermet casting process. During that process, a plurality of nozzle device displacements, and a plurality of drilling bit displacements, are inserted into a casting mold. After the housing is cast, those displacements are removed from the housing thereby leaving cavities in which nozzle devices and/or cutting bits are later inserted.

Using prior art methods, such nozzle device displacements and cutting bit displacements comprise graphite, and are formed by machining graphite rods. Exposure of the graphite displacements to the temperatures and pressures of the metal, ceramic, or cermet casting process, and the forces used to remove those displacements from the cast part, generally destroy those graphite displacements. In addition to destroying the graphite displacements, an inordinate amount of time is required to completely remove each and every graphite displacement from the cast part.

SUMMARY OF THE INVENTION

What is needed is a composition and method to mold nozzle device displacements, and/or complex cutting bit displacements, wherein the composition comprises a relatively inexpensive ceramic powder, and wherein the process to mold and cure the displacements is relatively short, and wherein the molded ceramic displacements can be more readily removed from the cast part.

Applicant's invention provides a method to form a cutting bit displacement, a nozzle displacement, and the like, wherein the method provides a plurality of ceramic particles and a plurality of resin particles. The method further grinds the plurality of ceramic particles until those ceramic particles comprise diameters less than 150 microns, and grinds the plurality of resin particles until those resin particles comprise diameters less than 100 microns, and forms a blend comprising the plurality of ground ceramic particles and the plurality of ground resin particles.

The method then disposes the blend into a mold comprising a cavity defining said nozzle displacement/cutting displacement. The method further densifies the blend, and cures the resin to form the cutting bit displacement/nozzle displacement.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
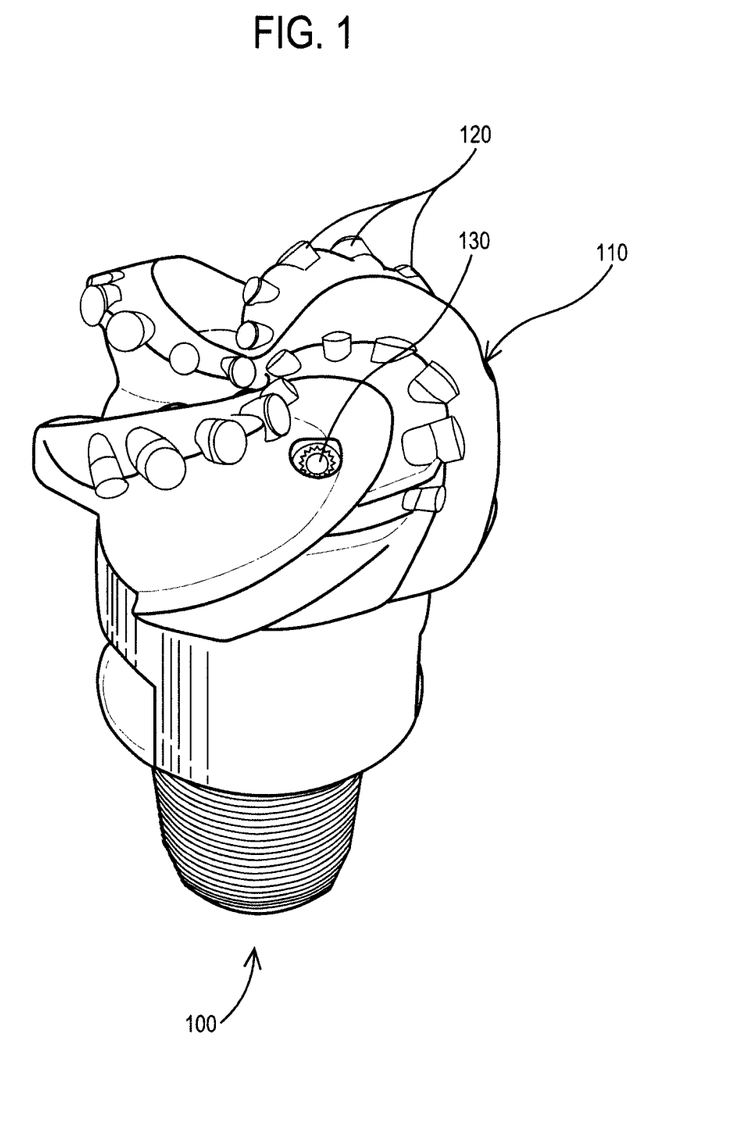
FIG. 1 is a perspective view of a drilling assembly.
Figure 2:
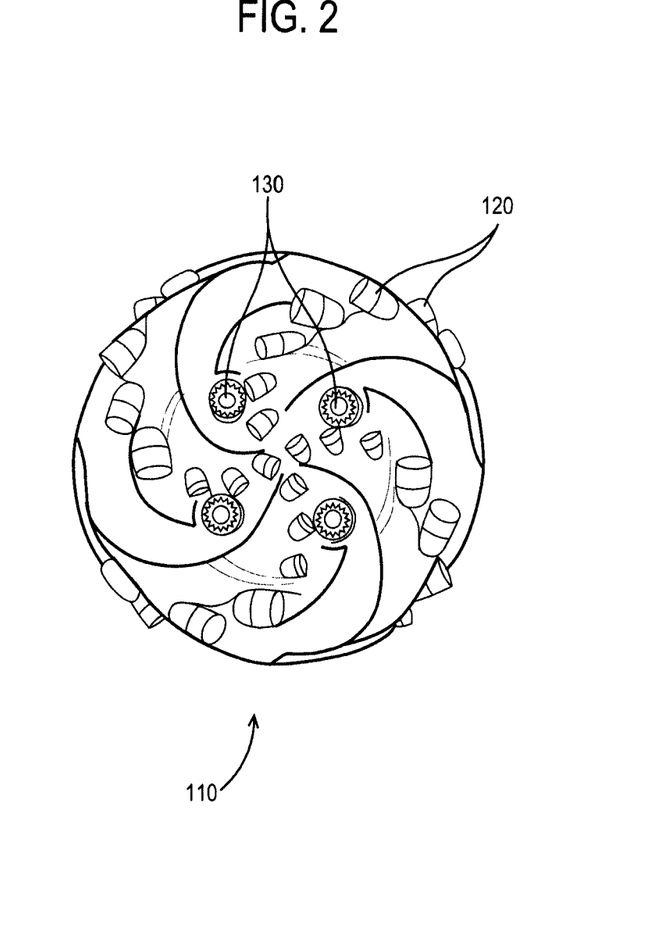
FIG. 2 is a top view of the drilling assembly of FIG. 1.

Referring now to FIGS. 1 and 2, drilling assembly 100 comprises housing 110, a plurality of drilling bits 120, and four nozzle devices 130. In the illustrated embodiment of FIGS. 1 and 2, each of the plurality of drilling bits 120, and each of the plurality of nozzle devices 130, are removeably disposed in housing 110.

Housing 110 is formed using a casting process wherein a mold defining the shape of housing 110 is prepared, and molten metal, ceramic, or cermet is disposed into that mold to form housing 110. Housing 110 is formed without the plurality of removable drilling bits 120 and without the plurality of removable nozzle devices 130 disposed therein. Rather, housing 110 is cast using a plurality of drilling bit displacements and a plurality of nozzle device displacements. Those displacements are placed in the mold cavity such that the molten metal, ceramic, or cermet flows around those displacements. Later, those displacements are removed to provide a cast housing assembly 110 comprising a plurality of drilling bit cavities and a plurality of nozzle device cavities. Individual drilling bits and nozzle devices are then removeably disposed in those drilling bit cavities and nozzle device cavities, respectively, to form drilling assembly 100.

Figure 3:
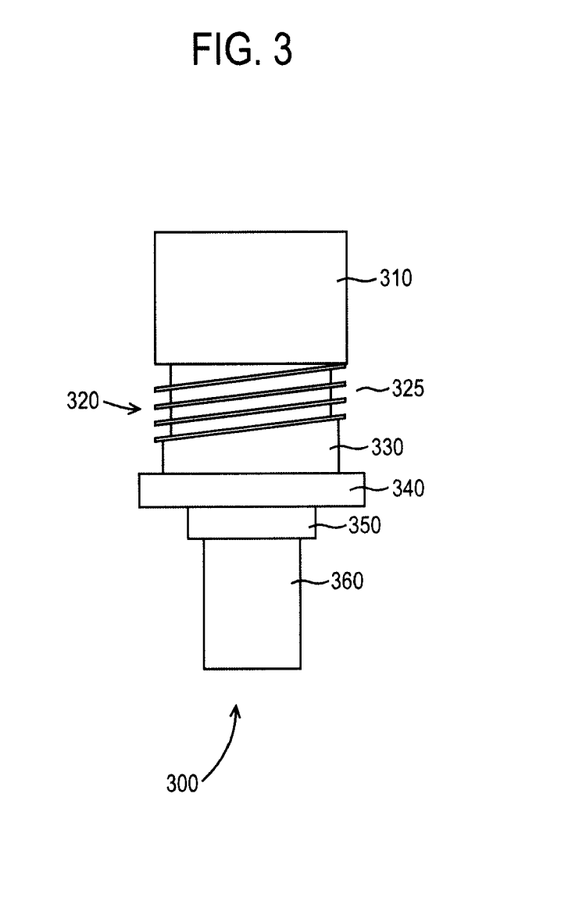
FIG. 3 illustrates a nozzle device displacement used in casting the nozzle housing portion of the drilling assembly of FIGS. 1 and 2.

Applicants' invention comprises a composition, and method using that composition, to form nozzle device displacements and/or cutting bit displacements. FIG. 3 shows a side view of nozzle device displacement 300. In the illustrated embodiment of FIG. 3, nozzle device displacement 300 comprises a complex shape having a circular symmetry. In the illustrated embodiment of FIG. 3, nozzle device displacement 300 comprising a first portion 310 comprising a cylindrical shape and a first diameter, a cylindrical threaded portion 320 comprising a plurality of interconnected, continuous threads 325 and a second diameter, a third portion 330 comprising a cylindrical shape and a third diameter, a fourth portion 340 comprising a cylindrical shape and a fourth diameter, a fifth portion 350 comprising a cylindrical shape and a fifth diameter, and a sixth portion 360 comprising a cylindrical shape and a sixth diameter.

Figure 4A:
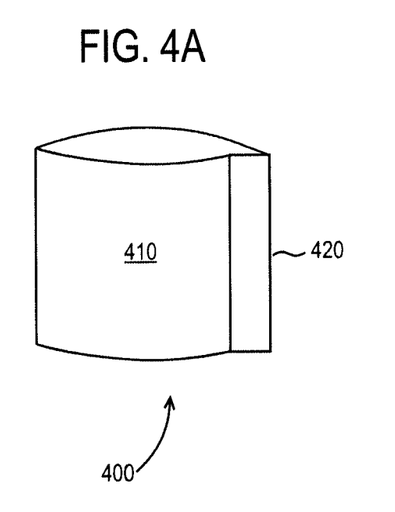
FIG. 4A is a side view of a first cutting bit displacement used in casting the housing portion of the drilling assembly of FIGS. 1 and 2.
Figure 4B:
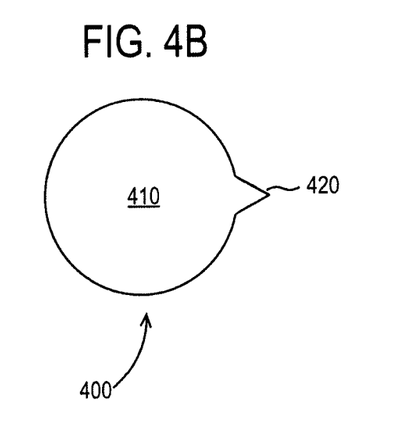
FIG. 4B is a top view of cutting bit displacement of FIG. 4A.
Figure 5:
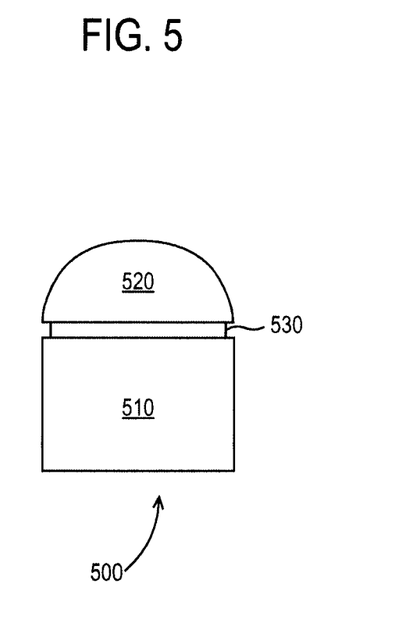
FIG. 5 is a side view of a second cutting bit displacement used in casting the housing portion of the drilling assembly of FIGS. 1 and 2.

Applicants' method is also particularly suited to forming complex cutting bit displacements. By "complex cutting bit," Applicants mean a cutting bit that comprises one or more alignment ridges, one or more grooves, and the like. For example and referring now to FIG. 4A, cutting bit displacement 400 comprises a cylindrical body 410 in combination with an alignment ridge 420 extending outwardly from body 410. Referring now to FIG. 5, cutting bit displacement 500 comprises a cylindrical body 510 and dome-shaped top 520, wherein cutting bit displacement 500 is formed to include alignment groove 530.

Figure 6:
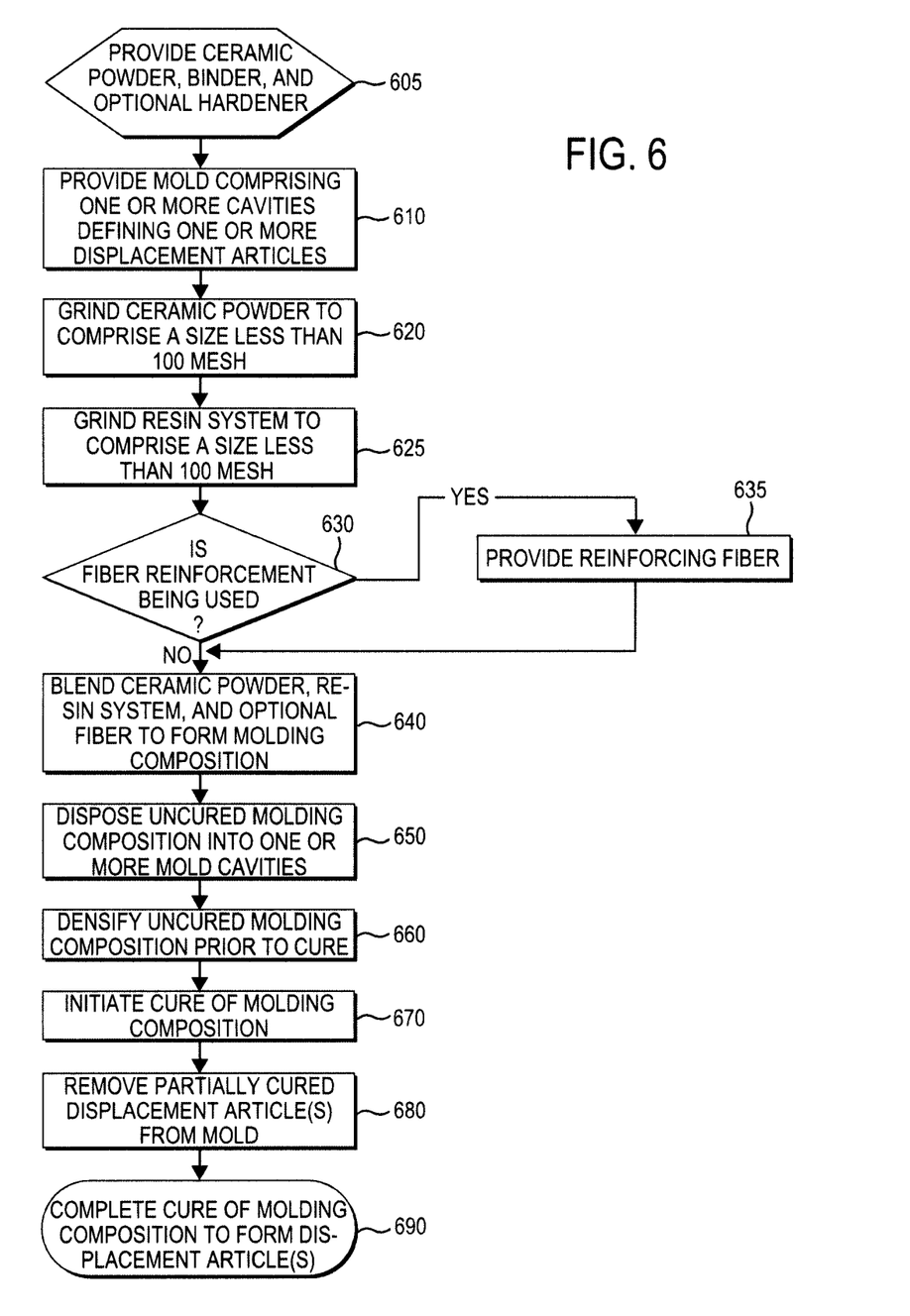
FIG. 6 is a flow chart summarizing the steps of Applicants' method to form nozzle device displacements and/or cutting bit displacements.

FIG. 6 summarizes the steps of Applicants' method to form nozzle device displacements and/or complex cutting bit displacements using Applicants' molding composition. Referring now to FIG. 6, in step 605 Applicants' method provides a ceramic powder. In certain embodiments, that ceramic powder is selected from the group consisting of, but not limited to, silica, zirconia, olivine, magnesium oxide, silica carbide, alumina oxide, and combinations thereof. Step 605 further comprises providing a resin system.

In certain embodiments, the resin system of step 605 comprises a thermosetting adhesive composition. In certain embodiments, the thermosetting resin system of step 605 is selected from the group consisting of a phenol-formaldehyde resin, a resorcinol-formaldehyde resin, a resol resin, a novalac resin, and a melamine resin. As those skilled in the art will appreciate, melamine resins are formed by a reaction of dicyandiamide with formaldehyde.

As those skilled in the art will appreciate, phenolic resins, melamine resol resins, novalacs, and formaldehyde resins comprise strong bonds and exhibit good resistance to high temperatures. In certain embodiments, Applicants' resin system comprises a one part system that cures with heat or heat and pressure. In other embodiments, Applicants' resin system comprises a resin, as described above, in combination with a hardener, wherein the resin system crosslinks, i.e. cures, with the application of heat.

In certain embodiments, Applicants' hardener comprises a diamine. In certain embodiments, Applicants' hardener comprises an aromatic diamine, such as and without limitation toluene diamine, diphenylmethane diamine, and the like. In certain embodiments, Applicants' hardener comprises an alkyl diamine, such as for example and without limitation hexamethylene diamine.

In step 620, Applicants' method grinds the ceramic powder of step 605. Applicants have found that the ceramic powder must be ground to smaller than 100 mesh. Applicants have found that use of powders having particles with diameters larger than about 150 microns result in the formation of displacements that comprise insufficient mechanical properties during the high temperature metal casting process.

In certain embodiments, step 620 comprises grinding the ceramic powder of step 605 until the particles comprising that powder comprise diameters less than about 150 microns. In certain embodiments, step 602 comprises forming a ceramic powder comprising particles having diameters less than about 150 microns and greater than about 30 microns. In certain embodiments, the average particle diameter is about 75 microns.

In step 625, Applicants' method grinds the resin system of step 605. Applicants have found that the resin system must be ground to smaller than 100 mesh. Applicants have found that use of resin systems comprising particles with diameters larger than about 150 microns result in the formation of displacements that comprise insufficient mechanical properties during the high temperature metal casting process.

In certain embodiments, step 625 comprises grinding the resin system of step 605 until the particles comprising that powder comprise diameters less than about 150 microns. In certain embodiments, step 625 comprises providing a resin system comprising particles having diameters less than about 150 microns and greater than about 30 microns. In certain embodiments, the average particle diameter is about 75 microns.

In step 630, Applicants' method determines if a fiber reinforcement will be used. In certain embodiments, Applicants' cutting bit displacements are formed without a fiber reinforcement. On the other hand in certain embodiments, Applicants' nozzle device displacements are formed using one or more fiber reinforcements. In Applicants' method elects not to use a fiber reinforcement, then the method transitions from step 630 to step 640.

If Applicants' method elects to use a fiber reinforcement, then the method transitions from step 630 to step 635 wherein the method provides a plurality of reinforcing fibers. In certain embodiments, Applicants' reinforcement fiber comprises carbon fiber. In certain embodiments, Applicants' reinforcement fiber comprises fiber glass. Applicants have found that fiber glass reinforcement fibers comprise a low coefficient of thermal expansion in combination with a high thermal conductivity. As a result, fiber glass reinforced displacements comprise a dimensionally stable material that more rapidly dissipates heat as compared to asbestos and organic fibers.

In certain embodiments, Applicants' fiber glass comprises a fiber glass mat. In certain embodiments, Applicants' fiber glass comprises a plurality of uncoated milled fibers comprising about a 200 micron length.

As those skilled in the art will appreciate, after removal from the cast housing 110 of the nozzle device displacements, and/or the cutting bit displacements, the walls of the resulting cavities must be as smooth as possible to facilitate later insertion of the nozzle devices or cutting bits. As those skilled in the art will further appreciate, the cavity walls formed in the cast housing 100 can be no smoother than the surface of the nozzle device/cutting bit displacements used during the metal casting process.

Applicants have found that using reinforcing fibers comprising a nominal length of about 200 microns imparts the optimal combination of mechanical strength and surface smoothness to the cured nozzle device/cutting bit displacements. More specifically, Applicants have found that using displacements comprising reinforcing fibers comprising a nominal length of about 200 microns results in optimal cavity formation in the metal casting process. Applicants have further found that use of longer fibers results in only a minimal mechanical property enhancement but also further results in a much rougher surface.

Applicants' method transitions from step 635 to step 640 wherein the method blends the ceramic powder, resin system, along with the optional fiber reinforcement of step 635. In certain embodiments, step 640 comprises using a twin shell V blender for approximately 30 minutes using 1/8" alumina media to insure a nearly homogenous mixture.

In certain embodiments, the blended composition of step 640 comprises between about 50 to about 95 weight percent ceramic powder, between about 5 to about 25 weight percent resin system, and between about 0 to about 25 weight percent reinforcing fiber. As a general matter, the weight percentage of resin system increases as the average particle size of the ceramic powder decreases.

Applicants' method transitions from step 640 to step 650 wherein the method loads this blended composition of step 640 into the mold provided in step 610. In step 660, Applicants' method densifies the blended composition disposed in the mold.

In certain embodiments, step 660 includes using isostatic pressing to densify the blended ceramic, resin, and reinforcement, molding composition. In certain embodiments, step 660 includes using uniaxial pressing to densify the blended ceramic, resin, and reinforcement, molding composition. In certain embodiments, step 660 includes using vibration to densify the blended ceramic, resin, and reinforcement, molding composition.

In step 670, Applicants' method initiates the cure of the nozzle device displacement(s) and/or cutting bit displacement(s). In certain embodiments, step 670 comprises heating the mold at a temperature of about 200° C. for about one hour. In certain embodiments, step 670 comprises using a forced air oven. In certain embodiments, step 670 comprises disposing the mold onto a conveyor belt which transports the mold through an oven. In certain embodiments, step 670 comprises using infrared heating.

In certain embodiments, the mold of step 610 is formed using a UV transparent material, and the binder of step 605 comprises a UV-curable binder, wherein in step 670 the mold is exposed to UV irradiation to effect the cure of the binder composition.

In step 680, the partially cured nozzle device/cutting bit displacement(s) are removed from the mold. In step 690, Applicants' method completes the cure of the nozzle device/cutting bit displacement(s). In certain embodiments, step 690 comprises heating the partially cured displacement(s) at about 200° C. for about one hour. In certain embodiments, step 690 comprises further exposing the partially cured displacement(s) to UV irradiation.

Figure 7:
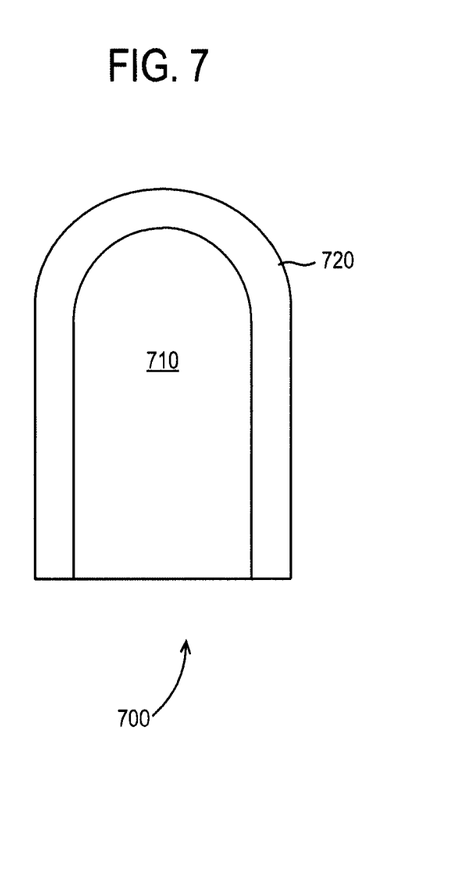
FIG. 7 is a cross-sectional view of a nozzle displacement comprising a graphite core encapsulated with a ceramic overcoat.

Referring now to FIG. 7, nozzle displacement 700 comprises a dual composition assembly which includes graphite core 710 and ceramic overcoat 720. Nozzle displacement 700 can be formed using the method of FIG. 6, wherein graphite core 710 is placed into the mold of step 610. In these embodiments, step 650 comprises first placing graphite core 710 into a mold cavity, and then disposing the blended molding composition of step 640 around that graphite core.

The cured graphite/ceramic displacement comprises a ceramic overcoat having a thickness of about 1/16 inch encapsulating the graphite inner core 710. In these embodiments, Applicant's molding composition sometimes comprises reinforcing fiber, as described hereinabove. Fiber loading in the molding composition is adjusted such that the cured ceramic overcoat comprises a coefficient of thermal expansion ("CTE") that matches the CTE of the graphite core 710.

In certain embodiments, individual steps recited in FIG. 6 may be combined, eliminated, or reordered.

While the preferred embodiments of the present invention have been illustrated in detail, it should be apparent that modifications and adaptations to those embodiments may occur to one skilled in the art without departing from the scope of the present invention as set forth in the following claims.

I claim:

1. A method to form a cutting bit displacement for use in a metal casting process, comprising:
   providing a plurality of ceramic particles; providing a plurality of resin particles; grinding said plurality of ceramic particles until said ceramic particles comprise diameters less than 150 microns; grinding said plurality of uncured resin particles until said resin particles comprise diameters less than 100 microns;
   forming a powder blend comprising said plurality of ground ceramic particles and said plurality of ground resin particles;
   disposing said powder blend into a mold comprising a cavity defining said nozzle displacement;
   densifying said blend; heating said mold at a temperature of about 100° C. for about one hour and then at a temperature of about 200° C. for about one hour to crosslink said resin to form said cutting bit displacement.

2. The method of claim 1, wherein said plurality of ceramic particles is selected from the group consisting of silica, zirconia, olivine, magnesium oxide, silica carbide, and alumina oxide, particles.

3. The method of claim 2, wherein said plurality of resin particles are formed from the group consisting of phenol-formaldehyde resin, resorcinol-formaldehyde resin, a resol resin, a novalac resin, and a melamine resin.

4. The method of claim 3, wherein said densifying step comprises densifying said blend using isostatic pressure.

5. The method of claim 3, wherein said densifying step comprises densifying said blend using uniaxial pressure.

6. The method of claim 3, wherein said densifying step comprises densifying said blend using vibration.

7. The method of claim 4, wherein:
   said resin comprises a ultraviolet ("UV") curable binder;
   said mold is formed from a UV transparent material;
   said curing step comprises exposing said mold to UV irradiation.

8. The method of claim 1, wherein said cutting bit displacement comprises an external surface comprising one or more alignment ridges extending outwardly therefrom.

9. The method of claim 1, wherein said cutting bit displacement comprises an external surface comprising one or more grooves extending inwardly therefrom.

10. A method to form a nozzle displacement, comprising:
providing a plurality of ceramic particles; providing a plurality of resin particles; providing a plurality of reinforcing fibers; grinding said plurality of uncured resin particles until said resin particles comprise diameters less than 100 microns;
grinding said plurality of uncured resin particles under said resin particles comprise diameters less than 100 microns;
forming a powder blend comprising said plurality of ground ceramic particles and said plurality of ground resin particles;
disposing said powder blend into a mold comprising a cavity defining said nozzle displacement;
densifying said blend; heating said mold at a temperature of about 100° C. for about one hour and then at a temperature of about 200° C. for about one hour to crosslink said resin to form said cutting bit displacement.

11. The method of claim 10, wherein said plurality of reinforcing fibers each comprise a length of about 200 microns.

12. The method of claim 11, wherein said plurality of reinforcing fibers are formed from uncoated milled fiber glass.

13. The method of claim 12, wherein said densifying step comprises densifying said blend using isostatic pressure.

14. The method of claim 13, wherein:
said resin comprises a ultraviolet ("UV") curable binder;
said mold is formed from a UV transparent material;
said curing step comprises exposing said mold to UV irradiation.

15. A method to form a nozzle displacement comprising a graphite core and a ceramic overcoat, comprising:
providing a plurality of ceramic particles;
providing a plurality of resin particles;
providing a cylindrical graphite member;
grinding said plurality of ceramic particles until said ceramic particles comprise diameters less than 150 microns;
grinding said plurality of resin particles under said resin particles comprise diameters less than 100 microns;
forming a powder blend comprising said plurality of ceramic particles and said plurality of resin particles;
disposing said cylindrical graphite member into a mold comprising a cavity defining said nozzle displacement;
disposing said powder blend into said mold such that said cylindrical graphite member is partially encapsulated by said powder blend;
densifying said blend;
curing said resin to form said nozzle displacement.

16. The method of claim 15, wherein said densifying step comprises densifying said blend using isostatic pressure.

17. The method of claim 15, wherein said densifying step comprises densifying said blend using uniaxial pressure.

18. The method of claim 16, wherein:
said resin comprises a ultraviolet ("UV") curable binder;
said mold is formed from a UV transparent material;
said curing step comprises exposing said mold to UV irradiation.

* * * * *